United States Patent
Minematsu et al.

(10) Patent No.: US 9,262,240 B2
(45) Date of Patent: Feb. 16, 2016

(54) ACCESSING CORRESPONDING ALTERNATIVE OPERATION CONFIGURATION INFORMATION OF APPLICATIONS RUNNING ON VIRTUAL MACHINES BASED ON REQUESTED CONFIGURATION INFORMATION INDICATING DATA FORMAT CONVERSION AND USER NAME

(75) Inventors: Mika Minematsu, Kawasaki (JP); Masataka Goto, Yokohama (JP); Shinya Murai, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 719 days.

(21) Appl. No.: 12/659,035

(22) Filed: Feb. 23, 2010

(65) Prior Publication Data

US 2010/0218184 A1 Aug. 26, 2010

(30) Foreign Application Priority Data

Feb. 24, 2009 (JP) ................................. 2009-040540

(51) Int. Cl.
*G06F 9/455* (2006.01)
*G06F 9/54* (2006.01)
(Continued)

(52) U.S. Cl.
CPC .............. *G06F 9/544* (2013.01); *G06F 9/4445* (2013.01); *G06F 9/45558* (2013.01); *G06F 17/30165* (2013.01); *G06F 17/30575* (2013.01)

(58) Field of Classification Search
USPC .......................................................... 718/1
See application file for complete search history.

(56) References Cited

U.S. PATENT DOCUMENTS 6,725,334 B2 * 4/2004 Barroso et al. ................ 711/122
6,760,815 B1 * 7/2004 Traversat ............ G06F 9/45504
707/999.202

(Continued)

FOREIGN PATENT DOCUMENTS

EP 1624642 A2 * 2/2006
JP 11-259496 9/1999

(Continued)

OTHER PUBLICATIONS

VMware, Inc., Workstation User's Manual, Chapter 8, "Transferring Files and Text Between the Host and the Guest", pp. 177-184.

(Continued)

*Primary Examiner* — Meng An
*Assistant Examiner* — Abu Ghaffari
(74) *Attorney, Agent, or Firm* — Nixon & Vanderhye, P.C.

(57) ABSTRACT

A setting storage unit stores first setting information that defines an operation of a first application that runs on a guest OS and second setting information that defines an operation of a second application that runs on at least one of another guest OS and a host OS. A correspondence storage unit stores first identification information for identifying the first setting information and second identification information for identifying the second setting information, in association with each other. An alternative access gaining unit reads from the correspondence storage unit the second identification information corresponding to the first identification information of the first setting information for which an access request is received, and accesses the second setting information of the second identification information that is read out, in place of the first setting information for which the access request is received.

10 Claims, 8 Drawing Sheets

(51) Int. Cl.
*G06F 9/44* (2006.01)
*G06F 17/30* (2006.01)

(56) References Cited

U.S. PATENT DOCUMENTS

| | | | |
|---|---|---|---|
| 7,251,815 B2* | 7/2007 | Donovan et al. | 718/105 |
| 7,647,344 B2* | 1/2010 | Skurtovich et al. | 707/999.107 |
| 7,962,545 B2 | 6/2011 | Knauerhase et al. | |
| 8,181,174 B2* | 5/2012 | Liu | 718/1 |
| 8,612,971 B1* | 12/2013 | Fitzgerald | G06F 9/45533 718/1 |
| 2003/0093647 A1* | 5/2003 | Mogi et al. | 712/1 |
| 2005/0198031 A1* | 9/2005 | Pezaris et al. | 707/9 |
| 2007/0198713 A1* | 8/2007 | Tsao et al. | 709/225 |
| 2007/0288247 A1* | 12/2007 | Mackay | 705/1 |
| 2009/0055840 A1 | 2/2009 | Hieda | |
| 2009/0192992 A1* | 7/2009 | Arthursson | G06F 9/45504 |
| 2009/0210427 A1* | 8/2009 | Eidler et al. | 707/10 |
| 2009/0307430 A1* | 12/2009 | Bruening et al. | 711/119 |
| 2011/0154325 A1* | 6/2011 | Terasaki | G06F 9/455 718/1 |

FOREIGN PATENT DOCUMENTS

| | | |
|---|---|---|
| JP | 2000-90033 | 3/2000 |
| JP | 2000-285052 | 10/2000 |
| JP | 2006-519423 | 8/2006 |
| JP | 2008-097201 | 4/2008 |
| WO | WO2006/101194 | 9/2006 |

OTHER PUBLICATIONS

Office Action dated Jul. 17, 2012 in JP Application No. 2009-040540 with English-language translation.

* cited by examiner

FIG.2

| ROLE | USER NAME | BOOKMARK FILE NAME | COOKIE FILE NAME | CACHE FOLDER NAME |
|---|---|---|---|---|
| PROVIDER | userA | C:\Documents and Settings\userA\Application Data\BrowserA\Profiles\xxxxxxxx.default\places.sqlite | C:\Documents and Settings\userA\Application Data\BrowserA\Profiles\xxxxxxxx.default\cookies.sqlite | C:\Documents and Settings\userA\Local Settings\Application Data\BrowserA\Profiles\xxxxxxxx.default\Cache\ |
| RECEIVER | userA | /home/userA/BrowserA/zzzzzzzz.default/places.sqlite | /home/userA/BrowserA/zzzzzzzz.default/cookies.sqlite | /home/userA/BrowserA/zzzzzzzz.default/Cache/ |

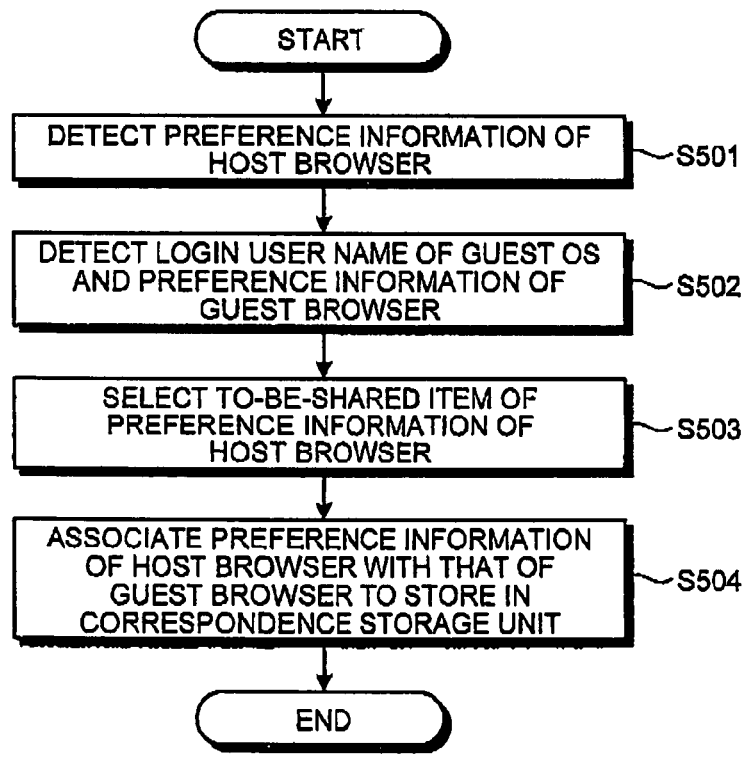

FIG.4

| BROWSER NAME | USER NAME | BOOKMARK FILE NAME | COOKIE FILE NAME | CACHE FOLDER NAME |
|---|---|---|---|---|
| BrowserB | userA | C:\Documents and Settings\userA\Favorites\ | C:\Documents and Settings\userA\Cookies\ | C:\Documents and Settings\userA\Local Settings\Temporary Internet Files\ |
| BrowserB | Administrator | C:\Documents and Settings\Administrator \Favorites\ | C:\Documents and Settings\Administrator \Cookies\ | C:\Documents and Settings\Administrator \Local Settings\Temporary Internet Files\ |
| BrowserA | userA | C:\Documents and Settings\userA\Application Data\BrowserA\Profiles\xxxxxxxx.default\places.sqlite | C:\Documents and Settings\userA\Application Data\BrowserA\Profiles\xxxxxxxx.default\cookies.sqlite | C:\Documents and Settings\userA\Local Settings\Application Data\BrowserA\Profiles\xxxxxxxx.default\Cache\ |
| BrowserA | Administrator | C:\Documents and Settings\Administrator \Application Data\BrowserA\Profiles\yyyyyyyy.default\places.sqlite | C:\Documents and Settings\Administrator \Application Data\BrowserA\Profiles\yyyyyyyy.default\cookies.sqlite | C:\Documents and Settings\Administrator \Local Settings\Application Data\BrowserA\Profiles\yyyyyyyy.default\Cache\ |

FIG.5

| BROWSER NAME | USER NAME | BOOKMARK FILE NAME | COOKIE FILE NAME | CACHE FOLDER NAME |
|---|---|---|---|---|
| BrowserA | userA | /home/userA/BrowserA/zzzzzzzz.default/places.sqlite | /home/userA/BrowserA/zzzzzzzz.default/cookies.sqlite | /home/userA/BrowserA/zzzzzzzz.default/Cache |

FIG.8

| ROLE | CONVERSION | BROWSER NAME | USER NAME | BOOKMARK FILE NAME | COOKIE FILE NAME | CACHE FOLDER NAME |
|---|---|---|---|---|---|---|
| PROVIDER | REQUIRED | BrowserB | userA | C:\Documents and Settings\userA\Favorites\ | C:\Documents and Settings\userA\Cookies\ | C:\Documents and Settings\userA\Local Settings\Temporary Internet Files\ |
| RECEIVER | | BrowserA | userA | /home/userA/BrowserA/zzzzzzzz.default/places.sqlite | /home/userA/BrowserA/zzzzzzzz.default/cookies.sqlite | /home/userA/BrowserA/zzzzzzzz.default/Cache/ |

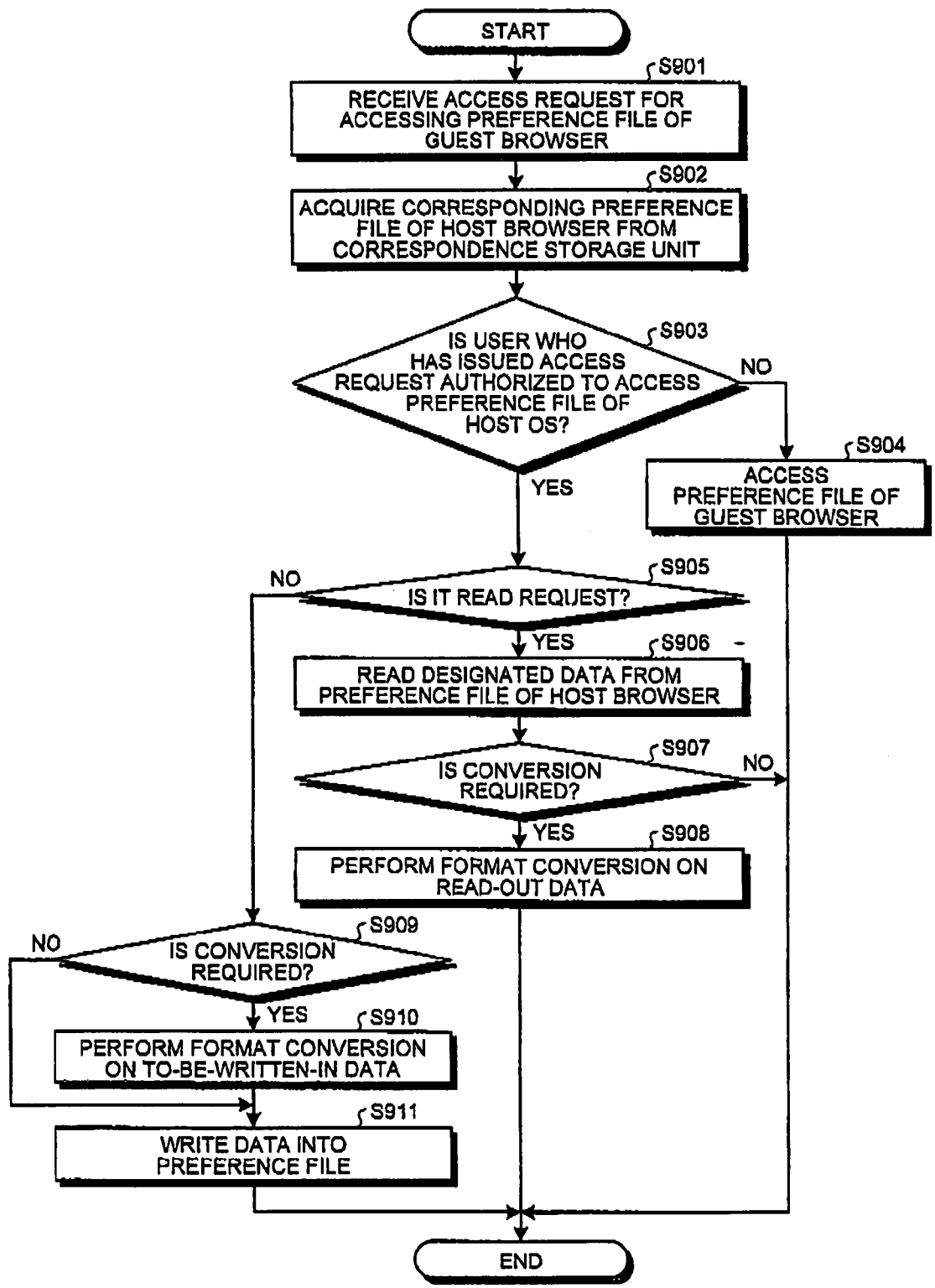

ACCESSING CORRESPONDING ALTERNATIVE OPERATION CONFIGURATION INFORMATION OF APPLICATIONS RUNNING ON VIRTUAL MACHINES BASED ON REQUESTED CONFIGURATION INFORMATION INDICATING DATA FORMAT CONVERSION AND USER NAME

CROSS-REFERENCE TO RELATED APPLICATIONS

This application is based upon and claims the benefit of priority from the prior Japanese Patent Application No. 2009-040540, filed on Feb. 24, 2009; the entire contents of which are incorporated herein by reference.

BACKGROUND OF THE INVENTION

1. Field of the Invention

The present invention relates to an information processing device in which setting information of an application that runs in a virtual machine environment is shared.

2. Description of the Related Art

Generally, a single operating system (OS) runs on a single information processing device. In some situations, different types of OSs may be used on a single information processing device. These situations include when different OSs are required for clerical work and development work, and when an application or a device that is not designed for a daily use OS needs to be used on another OS.

Meanwhile, a virtual machine environment has been realized, in which a plurality of virtual machines can be operated on a single information processing device. In the virtual machine environment, a plurality of virtual machines runs on a virtualization software program. The virtualization software program virtualizes hardware resources, and performs arbitration and the like for access to the hardware resources of the virtual machines.

A virtualization software program may be implemented directly or indirectly on the hardware. When it is indirectly implemented, a host OS runs on the hardware and serves as an operation basis, while a virtual software program runs on this host OS. The OS that runs on a virtual machine is called a guest OS, as opposed to a host OS.

In such a structure a regular-use OS serves as a host OS, and a guest OS of a different type from the host OS runs on the host OS.

In the virtual machine environment, hardware resources and the like are isolated from one another in accordance with individual virtual machines so that one virtual machine would not affect other virtual machines or the host OS. For example, a hard disk that is used from a virtual machine is actually a disk image file in most cases, and the isolation is established by determining a specific disk image file to be accessible to the corresponding virtual machine only.

Sometimes, data needs to be shared by a certain virtual machine and another virtual machine or the host OS. For example, it is preferable that browsers of the host OS and the guest OS can use the same setting information (preferences), such as a bookmark, which is determined for each user.

JP-A 2008-97201 (KOKAI) discloses a system in which bookmarks and a display history of a browser can be shared by different communication terminals by storing the bookmarks and the display history in a separately prepared server and referring to the bookmarks and the display history in this server.

In the method of JP-A 2008-97201 (KOKAI), however, the bookmarks and the display history need to be explicitly entered and downloaded, and if updates are made on the terminal side, they need to be explicitly re-entered into the server. Thus, there are drawbacks that a dynamically generated file such as a cache cannot be shared and that the latest preferences cannot be shared. Furthermore, because a separate server is required, the system depends on the usage environment.

According to the user's manual of VMware Workstation, "Using Shared Folders", on pp. 177-184, a technology has been suggested with which information can be shared without a server or the like that is intended for this purpose, by using a shared folder function of VMware virtualization software program. With the shared folder function, any folder (directory) of the host OS can be read directly from the guest OS by mounting it on the guest OS.

With the method of the VMware, however, information is shared not in units of files but in units of folders. This may cause unintended information sharing, and thus lowers the level of security. Furthermore, a driver for processing shared folders needs to be installed in the guest OS, but a shared folder function may not be implemented, depending on the type of the guest OS. The method therefore depends on the usage environment. In addition, sharing may depend the setting of the shared folder function, which lowers convenience for users.

Moreover, some browsers are configured in such a manner that preferences such as bookmarks cannot be used simultaneously with other browsers. Such browsers fail to open if more than one browser tries to look up the same preference file. For this reason, when the method of the VMware is adopted, it still requires a copy of preferences when the browser is opened on the host OS and the guest OS at the same time. This causes a problem that, in the same manner as in JP-A 2008-97201 (KOKAI), the latest preferences may not be shared, depending on the type of the browser.

SUMMARY OF THE INVENTION

According to an aspect of the present invention, an information processing device includes a virtualizing unit that virtualizes a hardware resource and controls access from a plurality of virtual machines to the hardware resource that is virtualized; a setting storage unit that stores first setting information that defines an operation of a first application that runs on a guest OS, which is an OS running on a virtual machine, and second setting information that defines an operation of a second application that runs on at least one of another guest OS and a host OS that operates the virtualizing unit; and a correspondence storage unit that stores first identification information with which the first setting information is identified, and second identification information with which the second setting information that is to be shared is identified, in association with each other, wherein the virtualizing unit includes a receiving unit that receives an access request for accessing the first setting information; and an alternative access gaining unit that, when the access request is received, reads from the correspondence storage unit the second identification information corresponding to the first identification information of the first setting information for which the access request is received, and accesses the second setting information of the second identification information that is read out.

According to another aspect of the present invention, there is provided an information processing method executed by an information processing device that includes a virtualizing unit that virtualizes a hardware resource and controls access from a plurality of virtual machines to the hardware resource that is virtualized; a setting storage unit that stores first setting information that defines an operation of a first application that runs on a guest OS, which is an OS running on the virtual machines, and second setting information that defines an operation of a second application that runs on at least one of another guest OS and a host OS that operates the virtualizing unit; and a correspondence storage unit that stores first identification information with which the first setting information is identified, and second identification information with which the second setting information that is to be shared is identified, in association with each other, the method including receiving an access request for accessing the first setting information; and reading from the correspondence storage unit, when the access request is received, the second identification information corresponding to the first identification information of the first setting information for which the access request is received, and accessing the second setting information of the second identification information that is read out.

A computer program product according to still another aspect of the present invention causes a computer to perform the method according to the present invention.

BRIEF DESCRIPTION OF THE DRAWINGS

FIG. 2 is a diagram showing an example data structure of correspondence information stored in a correspondence storage unit;

FIG. 3 is a flowchart showing an entire preference sharing initializing process according to the first embodiment;

FIG. 4 is a diagram showing an example of preference information detected by a second detecting unit;

FIG. 5 is a diagram showing an example of preference information detected by a first detecting unit;

FIG. 8 is a diagram showing an example data structure of correspondence information stored in a correspondence storage unit;

FIG. 9 is a flowchart showing an entire procedure of a preference sharing process according to the second embodiment.

DETAILED DESCRIPTION OF THE INVENTION

Exemplary embodiments of an information processing device according to the present invention are described in detail below with reference to the attached drawings.

In an information processing device according to a first embodiment, preferences are shared among browsers of the same type. In the following description, it is assumed that preferences of a browser that runs on a host OS are shared with a browser of the same type that runs on a guest OS. The same method is applicable to a situation in which preferences of a browser that runs on a guest OS is shared with a browser of the same type that runs on another guest OS. An application, of which setting information is sharable, is not limited to a browser, but the method is applicable to data sharing in other applications.

Figure 1:
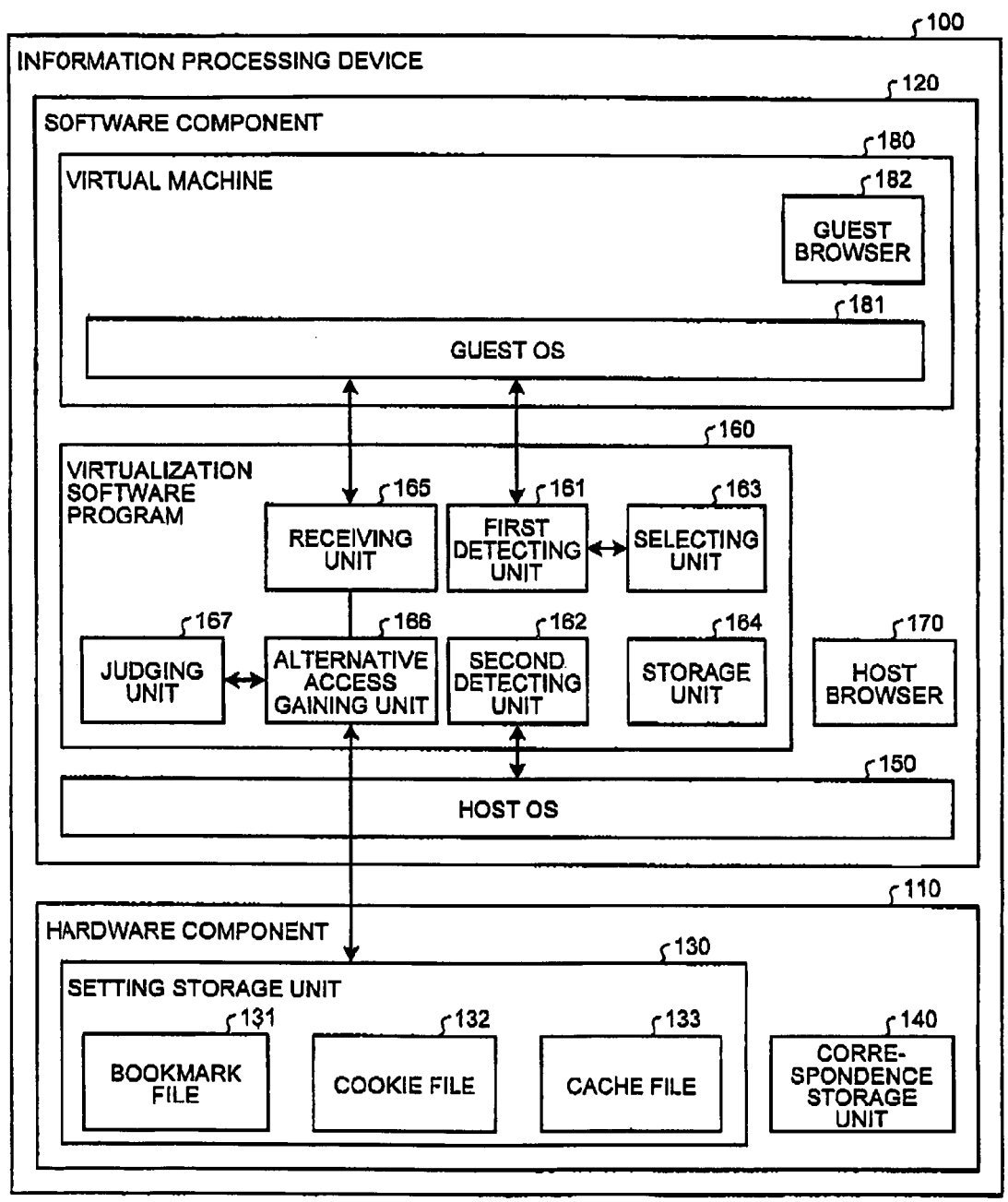
FIG. 1 is a block diagram showing an example structure of an information processing device according to a first embodiment.

As illustrated in FIG. 1, an information processing device 100 includes a hardware component 110 and a software component 120.

The hardware component 110 includes a setting storage unit 130 and a correspondence storage unit 140. The setting storage unit 130 stores preferences of a browser, such as a bookmark file 131, a cookie file 132, and a cache file 133. The setting storage unit 130 may also store preferences, such as a display history, a password file, and a browser setting file, although they are not shown in the drawing. The setting storage unit 130 of this drawing stores only one bookmark file 131, one cookie file 132, and one cache file 133, but a plurality of these files may be stored for respective users, for example. In the following description, the bookmark file 131, the cookie file 132, and the cache file 133 are also referred to as preference files.

The correspondence storage unit 140 stores correspondence information that associates preference information of a shared-information provider with preference information of a shared-information receiver. The preference information represents information with which the preferences that are setting information determined for individual users can be identified (identification information). For example, the name of the bookmark file 131 may serve as the preference information.

As illustrated in FIG. 2, the correspondence storage unit 140 stores roles, user names, bookmark file names, cookie file names, and cache folders name, in association with one another.

For the role, the shared-preference provider or the shared-preference receiver is specified. For the user name, the name of the user on a host OS 150 or a guest OS 181 is specified. In the example of FIG. 2, the preferences of a user "userA" of the host OS 150, which is the same as the login user name of the guest OS 181, are shared. For the bookmark file name and the cookie file name, the names of the bookmark file 131 and the cookie file 132 that correspond to the user name are specified. For the cache folder name, the name of a folder in which the cache file 133 for the corresponding user name is stored is specified. The folder name is specified, because a unit of sharing cache is a folder in which the cache file 133 is created.

The example of FIG. 2 shows that data items of the "provider" (the user name, the bookmark file name, the cookie file name, and the cache folder name) are associated with data items of the "receiver", forming correspondence information as a whole. The correspondence information shown in this drawing as an example is used when the preferences of a host browser 170 that runs on the host OS 150 are shared with a guest browser 182 that is the same type as the host browser 170 (BrowserA).

When preferences are shared between the host OS 150 and the guest OS 181, the host OS 150 provides to-be-shared information, and the guest OS 181 receives the information. When preferences are shared among a plurality of guest OSs 181, a file having the latest update is selected as to-be-shared preferences. The selection of to-be-shared preferences is not limited thereto. For example, a file of the larger size may be selected, or the preference explicitly designated by the user may be selected. When preferences are shared among three or more browsers, correspondence information is stored for each of the receivers.

If a plurality of browsers are installed on the host OS 150, a browser that has a preference file having the latest update is selected as the browser of which the preferences are shared.

The selection of a browser is not limited thereto. For example, a browser of the same type as the browser of the guest OS 181 may be selected, or a browser explicitly designated by the user may be selected.

The setting storage unit 130 and the correspondence storage unit 140 can be formed by any recording medium that is generally used, such as a random access memory (RAM), a hard disk drive (HDD), an optical disk, and a memory card. In addition, the hardware component 110 includes hardware resources such as a processor and a ROM, although they are not shown in the drawing.

The software component 120 includes the host OS 150, a virtual machine 180, a virtualization software program 160, and the host browser 170.

The host OS 150 operates on the hardware component 110 as an operation basis. For example, Windows (trademark) or Linux (trademark) may be used as the host OS 150. Regular applications including the host browser 170 run on the host OS 150. An application is a program that performs various processes on the host OS 150. The virtualization software program 160 also runs on the host OS 150.

The host browser 170 runs on the host OS 150. Only one host browser 170 is illustrated in FIG. 1, but host browsers 170 of different types may operate on the host OS150.

The host OS 150 may be eliminated, so that the virtualization software program 160 is implemented directly on the hardware component 110. In other words, the device may be formed of the virtual machine 180, the virtualization software program 160, and the hardware component 110.

The virtual machine 180 is realized by the virtualization software program 160. The guest OS 181 operates on the virtual machine 180, and the guest browser 182 runs on the guest OS 181. The guest OS 181 is configured to implement other applications in addition to the guest browser 182. Similarly to the host OS 150, Windows (trademark) or Linux (trademark) may be adopted for the guest OS 181.

A single guest OS 181 is illustrated in FIG. 1, but the number of guest OSs 181 can be set to any arbitrary number. The guest OSs 181 may be of different types, or of the same type.

The virtualization software program 160 functions as a virtualizing unit that virtualizes a hardware resource and controls accesses from the virtual machine 180 to the virtualized hardware resource. In other words, the virtualization software program 160 performs arbitration and the like for accesses from different guest OSs 181 to the shared hardware resource (hardware component 110). The virtualization software program 160 includes a first detecting unit 161, a second detecting unit 162, a selecting unit 163, a storage unit 164, a receiving unit 165, an alternative access gaining unit 166, and a judging unit 167.

The first detecting unit 161 acquires the login user name of the guest OS 181, and detects the type of the guest browser 182 installed in the guest OS 181. Then, the first detecting unit 161 acquires preference information including the name of the guest browser 182 and a directory path to the preference file corresponding to the login user name of the guest browser 182.

When a plurality of guest OS 181 is running, the first detecting unit 161 acquires the information for each guest OS 181.

The second detecting unit 162 detects the type of the host browser 170 installed in the host OS 150. Then, the second detecting unit 162 acquires the preference information including the name of the host browser 170, the name of the user, and a directory path to the preference file corresponding to the user name of the host browser 170.

The selecting unit 163 selects the user name of the host OS 150 corresponding to the login user name of the guest OS 181 that is acquired by the first detecting unit 161. For example, the selecting unit 163 selects the same user as the user name of the guest OS 181 from among the user names of the host OS 150. The selecting method adopted by the selecting unit 163 is not limited thereto, and any method for selecting one user name from the user names of the host OS 150 can be adopted. For example, the name of the current login user of the host OS 150 may be selected, or a user name explicitly designated by the user may be selected.

The storage unit 164 associates the preference information detected for the selected user name by the first detecting unit 161 with the preference information detected for this user name by the second detecting unit 162, and stores it in the correspondence storage unit 140.

The receiving unit 165 receives a request for accessing to the preferences from the guest OS 181. For example, the receiving unit 165 receives, as an access request, a request that the guest browser 182 write data into the preferences thereof or read data from the preferences thereof.

When a request for accessing to the preference file of the preference receiving OS (e.g., the guest OS 181) in the correspondence storage unit 140 is received, the alternative access gaining unit 166 refers to the correspondence information stored in the correspondence storage unit 140, and accesses the corresponding preference file on the host OS 150 instead. For example, when the name of the preference file (e.g., the bookmark file 131) for the name of the user whose role is "receiver" is stored in the correspondence storage unit 140, the alternative access gaining unit 166 reads the name of each of the corresponding preference files on the "provider" side. Then, the alternative access gaining unit 166 accesses to the preference file of the read-out name.

When the access request is a write request, the alternative access gaining unit 166 writes designated data into the preference file of the read-out name, and returns the write result to the requestor. When the access request is a read request, the alternative access gaining unit 166 reads the designated data from the preference file of the read-out name, and returns the read-out data to the requestor.

The judging unit 167 judges whether the user of the guest OS 181 that issues the read/write request with respect to the preference file is authorized to read data from and write data into the corresponding preference file of the host OS 150.

A preference sharing initializing process performed by the information processing device 100 having the above structure according to the first embodiment is described below with reference to FIG. 3. It is assumed here that the virtualization software program 160 is running for service when the information processing device 100 is activated.

First, the second detecting unit 162 detects the preference information of the host browser 170 that runs on the host OS 150 (step S501). In FIG. 4, two users, userA and Administrator, are on the host OS 150, and two types of browsers, BrowserA and BrowserB, are detected for each user. The preference information that is detected may include the display history, a password file, and a browser setting file, although these items are not shown in the drawing.

Next, the first detecting unit 161 detects the login user name of the guest OS 181 and the preference information of the guest browser 182 that runs on the guest OS 181 (step S502).

The first detecting unit 161 and the second detecting unit 162 detect the login user name and the preference information using a certain method that corresponds to the types of the guest OS 181 and the host OS 150. For example, when the guest OS 181 is Linux (trademark), the login user name can be acquired from the virtualization software program 160 by reading "/var/run/utmp" from a disk image file of the guest OS 181.

In the example of FIG. 5, the login user name is detected as userA, and the type of the guest browser 182 is detected as BrowserA. Preference information such as a display history, a password file, and a browser setting file may be detected, although these items are not shown in the drawing.

Next, the selecting unit 163 selects to-be-shared preference information from the detected preference information of the host browser 170 (step S503). For example, the selecting unit 163 selects, from the preference information of FIG. 4, the preference information of the BrowserA having the user name that is userA, as the preference information of the to-be-shared preferences.

Next, the storage unit 164 stores the correspondence information in which the preference information of the host browser 170 (BrowserA) on the shared-information provider side is associated with the preference information of the guest browser 182 (BrowserB) on the receiver side, in the correspondence storage unit 140 (step S504), and the preference sharing initializing process is terminated.

Figure 6:
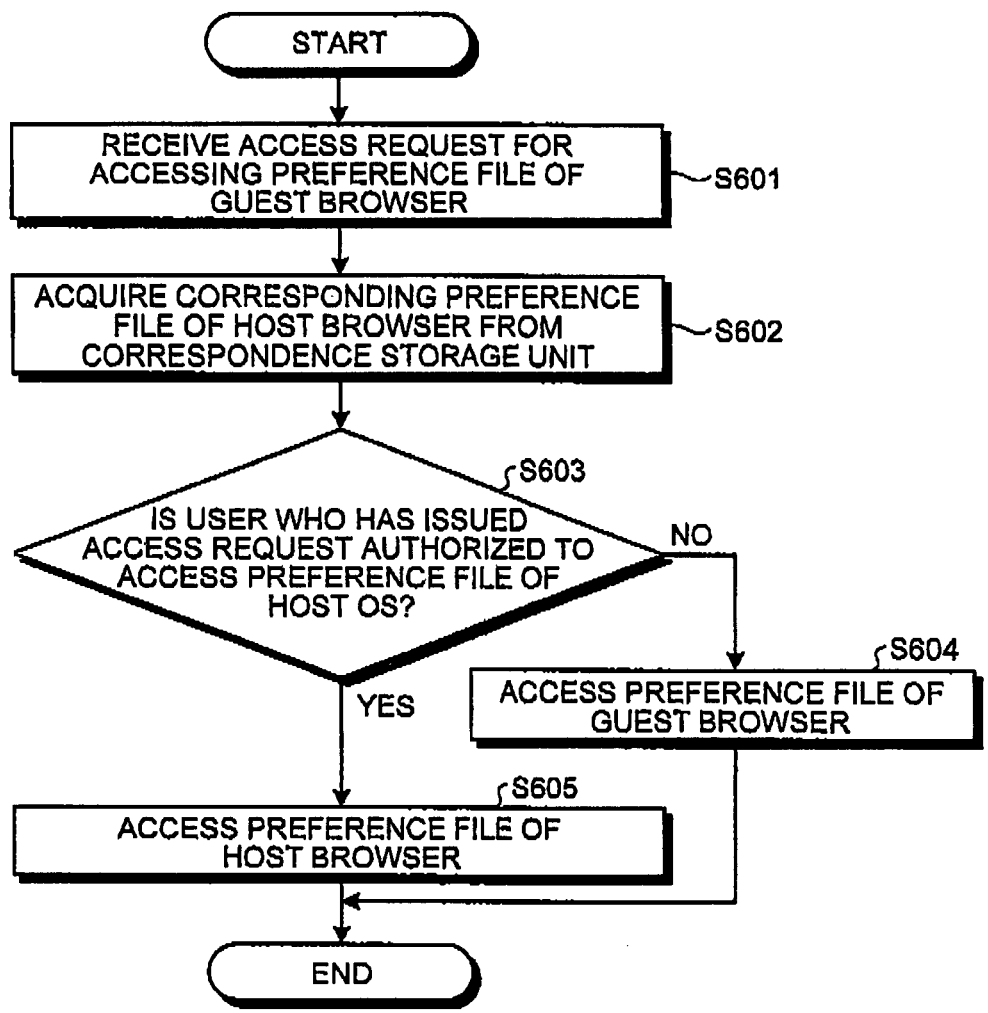
FIG. 6 is a flowchart showing an entire procedure of a preference sharing process according to the first embodiment.

Next, a preference sharing process performed by the information processing device 100 having the above structure according to the first embodiment is described below with reference to FIG. 6.

First, the receiving unit 165, receives a request for reading data from or writing data into the preference file of the guest browser 182 stored in the correspondence storage unit 140 (step S601).

The virtualization software program 160 virtualizes the hardware resource, and arbitrates accesses from a plurality of guest OSs 181 to the hardware resource. This holds the same for the hard disk. In other words, the virtualization software program 160 hooks an access request from a'guest OS 181 to a file, and recognizes which guest OS 181 issues the access request to which file. Because of this feature, the reading and writing that is performed on the preference file by the guest browser 182 running on the guest OS 181 can be detected. For the mapping from the guest OS 181 to the user name, the information stored in the correspondence storage unit 140 is used.

Next, the alternative access gaining unit 166 acquires the name of the preference file of the host browser 170 corresponding to the preference file of the guest browser 182 for which reading or writing is requested, from the correspondence storage unit 140 (step S602).

Then, the judging unit 167 judges whether the user of the guest OS 181 that has made the request of reading or writing is authorized to read data from or write data into the preference file of the acquired name (step S603).

For example, the judging unit 167 can control accesses by referring to the access permissions setting of the preference file on the host OS 150. The judgment of the access authorization, however, is not limited thereto, and any conventional method can be adopted. For example, the judging unit 167 may be configured to have its own rules for access control, and judge the access authorization based on these rules.

When it is determined that the user is not authorized to access (NO at step S603), the virtualization software program 160 accesses the preference file of the guest browser 182 in an ordinary manner (step S604). When it is determined that the user is authorized to access (YES at step S603), the alternative access gaining unit 166 accesses the preference file of the file name acquired at step S602 (the preference file of the host browser 170) (step S605).

In the example of FIG. 2, when the guest OS 181 issues a read request with respect to a bookmark file of the guest browser 182 "/home/userA/BrowserA/zzzzzzzz.default/places.sqlite", the virtualization software program 160 hooks this read request. The alternative access gaining unit 166 detects that this file is stored in the correspondence storage unit 140 and that the user corresponding to the guest OS 181 is the userA. The judging unit 167 judges whether this userA is authorized to read a bookmark file "C:¥Documents and Settings¥userA¥Application Data¥BrowserA¥Profiles¥xxxxxxxx.default¥places.sqlite" of the host browser 170. When the userA is authorized to read, the alternative access gaining unit 166 reads the bookmark file from the host browser 170. When the userA is not authorized to read, the virtualization software program 160 reads the bookmark file from the guest browser 182.

In the case of a cache, not a file but a folder is shared. For example, a cache file "/home/userA/BrowserA/zzzzzzzz.default/Cache/XXXXXXXXXXX" of the guest browser 182 is associated with a cache file "C:¥Documents and Settings¥UserA¥Local Settings¥Application Data¥BrowserA¥Profiles¥xxxxxxxx.default¥Cache¥XXX-XXXXXXXX" of the host browser 170.

In this manner, the information processing device according to the first embodiment hooks only an access request issued by a specific user with respect to a specific file by use of the virtualization software, and realizes an access request with respect to a corresponding file of the host OS instead. Thus, the latest setting information (preferences) can be shared among the browsers in the virtual machine environment. Moreover, the device allows minimal users to use minimal files, and thereby retains security when sharing the latest setting information. In addition, because the system for sharing files is introduced to the virtualization software, it does not depend on the use environment, nor does it require any change to the user setting. Thus, it offers convenience to users.

According to the first embodiment, the preferences are shared among browsers of the same type. In contrast, an information processing device according to a second embodiment shares the preferences with browsers of different types. In the following description, it is assumed that preferences of a "BrowserB", which is a browser that runs on the host OS, are shared with a "BrowserA", which is a browser that runs on the guest OS. For example, the preferences of "Internet Explorer 6" (trademark) that runs on the host OS Windows (trademark) are shared with "Firefox 3" (trademark) that runs on the guest OS Linux (trademark).

Figure 7:
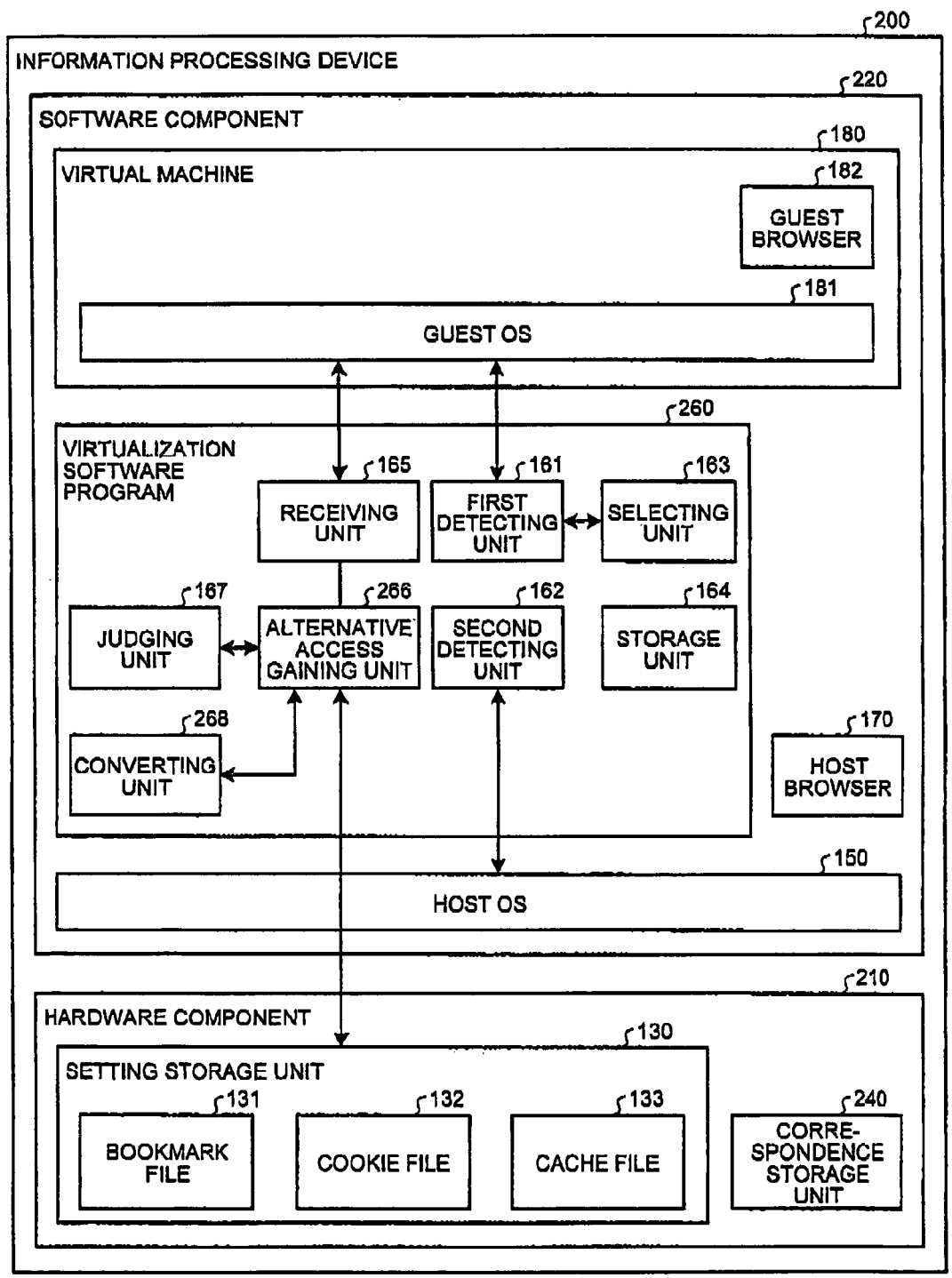
FIG. 7 is a block diagram showing an example structure of an information processing device according to a second embodiment.

As shown in FIG. 7, an information processing device 200 includes a hardware component 210 and a software component 220.

The second embodiment is different from the first embodiment in that a converting unit 268 is newly added to a virtualization software program 260 of the software component 220. Also, the function of an alternative access gaining unit 266 of the virtualization software program 260 and the data structure of a correspondence storage unit 240 of the hardware component 210 are different from those of the first embodiment. The rest of the structure and functions is the same as the first embodiment, and thus the explanation thereof is omitted.

The correspondence storage unit 240 stores information that indicates whether the format of a preference file should be converted between the host browser 170 and the guest browser 182. As shown in FIG. 8, the correspondence storage unit 240 includes, in addition to the data stored in the correspondence storage unit 140 according to the first embodiment of FIG. 2, a conversion field that indicates whether the format conversion is required and a browser name field. In the example of FIG. 8, the conversion "required" is indicated. When the conversion is not required, "not required" may be set in the conversion field.

The alternative access gaining unit 266 judges, in addition to the function of the alternative access gaining unit 166 according to the first embodiment, whether the need for format conversion is stored in the correspondence storage unit 240 when data is read from or written into the preference file stored in the correspondence storage unit 240.

The converting unit 268 converts, when the need for format conversion is stored in the correspondence storage unit 240, the format of the data read from the corresponding preference file and the format of the data that is to be written into the corresponding preference file, in accordance with the types of the host browser 170 and the guest browser 182.

Next, the preference sharing process performed by the information processing device 200 that has the above structure according to the second embodiment is described below with reference to FIG. 9. In this preference sharing initializing process, the information that is stored is changed as described above, but the procedure of the process is the same as that of the first embodiment (see FIG. 3). Thus, the explanation thereof is omitted.

The access request receiving process and the access authorization judging process at steps S901 through S904 are the same as the processes conducted at steps S601 through S604 by the information processing device 100 according to the first embodiment, and thus the explanation thereof is omitted.

When it is judged that the browser is authorized to access the preference file (YES at step S903), the alternative access gaining unit 266 judges whether the access request is a read request (step S905). When it is a read request (YES at step S905), the alternative access gaining unit 266 reads designated data from the preference file of the file name acquired at step S902 (the preference file of the host browser 170) (step S906).

Next, the alternative access gaining unit 266 refers to the correspondence storage unit 240, and judges whether the need for format conversion is stored (step S907). When the conversion is required (YES at step S907), the alternative access gaining unit 266 passes the read-out data to the converting unit 268. The converting unit 268 converts the format of the received data in accordance with the names of the host browser 170 and the guest browser 182 (step S908). The names of the browsers can be acquired from the correspondence storage unit 240.

When the conversion is not required (NO at step S907), the alternative access gaining unit 266 returns the read-out data to the requester without converting it (not shown), and the preference sharing process is terminated.

When it is judged at step S905 that the access request is not a read request, i.e., a write request (NO at step S905), the alternative access gaining unit 266 refers to the correspondence storage unit 240, and judges whether the need for format conversion is stored (step S909). When the conversion is required (YES at step S909), the alternative access gaining unit 266 passes the to-be-written data to the converting unit 268. The converting unit 268 converts the format of the received data in accordance with the names of the host browser 170 and the guest browser 182 (step S910).

When the conversion is not required (NO at step S909), or after the format conversion is conducted at step S910, the alternative access gaining unit 266 writes the requested data into the preference file (step S911), and the preference sharing process is terminated.

Next, a specific example of the format conversion is described. For example, character codes in a bookmark file of Internet Explorer 6 (trademark) are stored as Shift_JIS data, but character codes in a bookmark file of Firefox 3 (trademark) are stored as UTF-8 data. Furthermore, the bookmarks of Internet Explorer 6 (trademark) are stored as a text file, the bookmarks of Firefox 3 (trademark) are stored as a SQLite3 database. On Internet Explorer 6 (trademark), the bookmarks and the display history are separately managed, but on Firefox 3 (trademark), the bookmarks and the display history are managed in the same database.

Thus, when the bookmark file of either one of the browsers is shared by the other browser, the character codes and the file format of the bookmarks need to be converted.

In the example of FIG. 8, when the guest OS 181 issues a write request to add a bookmark to the bookmark file "/home/userA/BrowserA/zzzzzzzz.default/places.sqlite" of the guest browser 182, the virtualization software program 260 hooks this write request. The alternative access gaining unit 266 judges that the need for format conversion is stored in the correspondence storage unit 240 with respect to this file. The alternative access gaining unit 266 therefore passes the to-be-written data to the converting unit 26B. The converting unit 268 converts the character codes of the data from UTF-8 to Shift_JIS. The converting unit 268 also judges whether the data is bookmark information or display history information. If it is bookmark information, the alternative access gaining unit 266 writes the data into the bookmark file "C:¥Documents and Settings¥userA¥Favorites¥" of the host browser 170. If it is display history information, the alternative access gaining unit 266 writes the data into the display history "C:¥Documents and Settings¥userA¥Local Settings¥History" of the host browser 170.

It is assumed that the guest OS 181 issues a read request for reading data from the bookmark file "/home/userA/BrowserA/zzzzzzzz.default/places.sqlite" of the guest browser 182 to check the bookmarks. The alternative access gaining unit 266 judges that the need for format conversion is indicated in the correspondence storage unit 240 with respect to this file. The alternative access gaining unit 266 therefore checks the information necessary for the converting unit 268 to convert the format. Then, the alternative access gaining unit 266 reads the bookmark file "C:¥Documents and Settings¥userA¥Favorites¥" and the display history "C:¥Documents and Settings¥userA¥Local Settings¥History" of the host browser 170, which are text files. The converting unit 268 combines the read-out data of the bookmark information and the display history information, converts the character codes from Shift_JIS to UTF-8, and further converts the data to the SQLite3 database format.

In Internet Explorer 6 (trademark), the bookmarks and the display history are managed in separate files. In Firefox 3 (trademark), the bookmarks and the display history are managed in a single database.

The database "places.sqlite" for managing the bookmarks and the display history in Firefox 3 (trademark) includes a URL table, a bookmark table, a comment table, a favorite icon table, and a history table.

Usually, an entry is added to the URL table and the history table when a new web page is displayed. When a bookmark is added, an entry is added to the bookmark table, the comment table, and the favorite icon table. Thus, when a write request is issued with respect to the places.sqlite, whether the data is display history information or bookmark information can be determined by analyzing the to-be-written data. An entry may not always be added to the favorite icon table.

When a read request is issued with respect to the places.sqlite, the bookmark file and the display history file of the host browser 170 are read out and the information of these files is combined. However, only the bookmark file may be read out, or only the display history file may be read out.

The format conversion between a text file and a SQLite3 database can be performed by use of SQLite3 commands.

For example, a SQLite3 database "places.sqlite" can be converted to a text file "places.dump" by a command "$ echo '.dump'|sqlite3 places.sqlite>places.dump".

In contrast, the text file "places.dump" can be converted to the SQLite3 database "places.sqlite" by a command "$ cat places.dump|sqlite3 places.sqlite".

Similarly, a character code conversion and a file format conversion for preferences other than bookmarks are conducted as needed.

In the information processing device according to the second embodiment, when hooking a request from a specific user for accessing a specific file with a virtualization software program and issuing a request for accessing a corresponding file on the host OS instead, the format of the read-out data and the to-be-written data is converted as needed, so that the latest preferences can be securely shared among browsers of different virtual machine environments.

Figure 10:
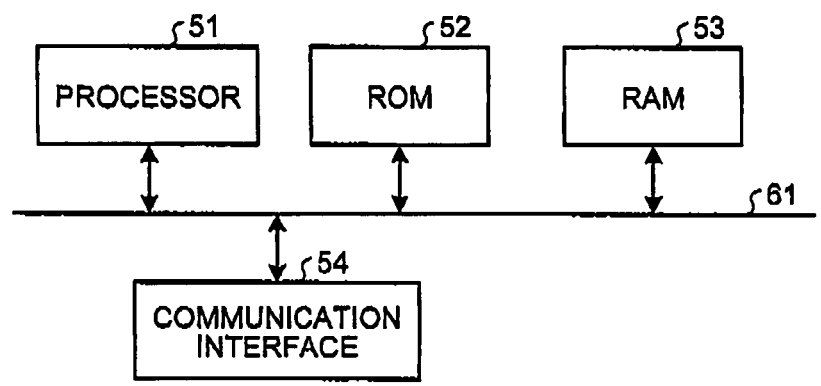
FIG. 10 is a diagram explaining a hardware structure of the information processing device according to the first and second embodiments.

Next, the hardware structure of the information processing device according to the first and second embodiments is explained with reference to FIG. 10.

The information processing device according to the first and second embodiments has a hardware structure using an ordinary computer, including a controlling device such as a processor 51, storage devices such as a read only memory (ROM) 52 and a RAM 53, a communication interface 54 that is connected to a network to establish communication, external storage devices such as a hard disk drive (HDD) and a compact disc (CD) drive, a display device, an input device such as a keyboard and a mouse, and a bus 61 that connect these components.

An information processing program executed by the information processing device according to the first and second embodiments is offered as a computer program product in an installable or executable file and stored in a computer-readable recording medium such as a compact disk read only memory (CD-ROM), a flexible disk (FD), a compact disk recordable (CD-R), and a digital versatile disk (DVD).

The information processing program according to the first and second embodiments may be stored and offered in a ROM or the like.

The information processing program executed by the information processing device according to the first and second embodiments has a module structure including the above units (the first detecting unit, the second detecting unit, the selecting unit, the storage unit, the receiving unit, the alternative access gaining unit, and the judging unit). As an actual hardware structure, when the processor 51 reads the information processing program from the storage medium and executes the program, the above units are loaded and created on the main storage device.

The present invention is not limited to the above embodiments, but may be realized by modifying the structural elements without departing from the scope of the invention. Furthermore, various inventions can be created by suitably combining some of the structural components according to the embodiments. For example, some of the components may be omitted from the embodiments. Structural components of different embodiments may be suitably combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing device, comprising:
a virtualizing unit that virtualizes a hardware resource and controls access from a plurality of virtual machines to the hardware resource that is virtualized;
a non-transitory setting storage unit that stores one or more pieces of first setting information and one or more pieces of second setting information, the first setting information defining an operation of a first application that runs on a guest OS, which is an OS running on a virtual machine, the second setting information, to be shared, being different from the first setting information and defining an operation of a second application that runs on at least one of another guest OS and a host OS that operates the virtualizing unit; and
a non-transitory correspondence storage unit that stores first identification information, second identification information, and conversion information mapped to each other based on user name, the first identification information identifying one of the pieces of the first setting information, the second identification information identifying one of the pieces of the second setting information, and the conversion information indicating whether a conversion is necessary between data formats of the first setting information and the second setting information,
wherein the virtualizing unit comprises
a receiving unit that receives an access request for accessing one of the pieces of the first setting information; and
an alternative access gaining unit that reads from the non-transitory correspondence storage unit the second identification information corresponding to the first identification information of one of the pieces of the first setting information for which the access request is received by the receiving unit, and, instead of accessing the requested one of the pieces of the first setting information in accordance with the access request, accesses one of the pieces of the second setting information of the second identification information that is read out;
the alternative access gaining unit further judges whether the conversion information corresponding to the first identification information of one of the pieces of the first setting information for which the access request is received indicates that the conversion of the data formats is necessary, and
the device further comprises a converting unit that executes, when it is judged that the conversion of the data formats is necessary, one or both of a conversion of data format of data that is to be written into one of the pieces of the second setting information and a conversion of data format of data that is read from one of the pieces of the second setting information.

2. The device according to claim 1, further comprising a judging unit that judges whether a user who has issued the access request for accessing one of the pieces of the first setting information received by the receiving unit is authorized to access one of the pieces of the second setting information, wherein when it is judged that the user who has issued the access request is authorized to access one of the pieces of the second setting information, the alternative access gaining unit reads from the non-transitory correspondence storage unit the second identification information corresponding to the first identification information of one of the pieces of the first setting information for which the access request is received, and accesses one of the pieces of the second setting information of the second identification information that is read out.

3. The device according to claim 1, wherein
the non-transitory setting storage unit stores one or more pieces of the first setting information and one or more pieces of the second setting information, each piece of the first setting information being predetermined for each user of the guest OS and defining the operation of the first application,
the receiving unit receives from the user of the guest OS the access request for accessing one of the pieces of the first setting information, and
the alternative access gaining unit reads from the non-transitory correspondence storage unit the second identification information corresponding to the first identification information of one of the pieces of the first setting information predetermined for the user who has issued the access request, and accesses one of the pieces of the second setting information of the second identification information that is read out.

4. The device according to claim 1, further comprising
a first detecting unit that detects one of the pieces of the first setting information;
a second detecting unit that detects one of the pieces of the second setting information; and
a storage controller that stores in the non-transitory correspondence storage unit the first identification information of one of the pieces of the first setting information that is detected and the second identification information of one of the pieces of the second setting information that is detected, mapped to each other based on user name.

5. The device according to claim 4, wherein
the second detecting unit detects the pieces of the second setting information that are predetermined for respective users,
the device further comprises a selecting unit that selects one of the pieces of the second setting information corresponding to one of the pieces of the first setting information from the pieces of the second setting information that are detected, and
the storage controller stores in the non-transitory correspondence storage unit the first identification information of the one of the pieces of first setting information that is detected and the second identification information of one of the pieces of the second setting information that is selected, mapped to each other based on user name.

6. The device according to claim 5, wherein the selecting unit selects, from the pieces of the second setting information that are detected, one of the pieces of the second setting information that is predetermined for the same user as the user of one of the pieces of the first setting information.

7. The device according to claim 5, wherein the selecting unit selects, from the pieces of the second setting information that are detected, one of the pieces of the second setting information predetermined for a login user of one of the another guest OS and the host OS.

8. The device according to claim 5, wherein the selecting unit selects one of the pieces of the second setting information that is designated by the user, from the pieces of the second setting information that are detected.

9. An information processing method executed by an information processing device that comprises a virtualizing unit that virtualizes a hardware resource and controls access from a plurality of virtual machines to the hardware resource that is virtualized; a non-transitory setting storage unit that stores one or more pieces of first setting information and one or more pieces of second setting information, the first setting information defining an operation of a first application that runs on a guest OS, which is an OS running on a virtual machine, the second setting information, to be shared, being different from the first setting information and defining an operation of a second application that runs on at least one of another guest OS and a host OS that operates the virtualizing unit; and a non-transitory correspondence storage unit that stores first identification information, second identification information, and conversion information mapped to each other based on user name, the first identification information identifying one of the pieces of the first setting information, the second identification information identifying one of the pieces of the second setting information, and the conversion information indicating whether a conversion is necessary between data formats of the first setting information and the second setting information, the method comprising:

receiving an access request for accessing one of the pieces of the first setting information;

reading from the non-transitory correspondence storage unit the second identification information corresponding to the first identification information of one of the pieces of the first setting information for which the access request is received by the receiving unit, and, instead of accessing the requested one of the pieces of the first setting information in accordance with the access request, accessing one of the pieces of the second setting information of the second identification information that is read out;

judging whether the conversion information corresponding to the first identification information of one of the pieces of the first setting information for which the access request is received indicates that the conversion of the data formats is necessary; and executing, when it is judged that the conversion of the data formats is necessary, one or both of a conversion of data format of data that is to be written into one of the pieces of the second setting information and a conversion of data format of data that is read from one of the pieces of the second setting information.

10. A computer program product including a non-transitory computer-readable recording medium that includes a plurality of information processing instructions that are executable on a computer, which comprises a virtualizing unit that virtualizes a hardware resource and controls access from a plurality of virtual machines to the hardware resource that is virtualized; a non-transitory setting storage unit that stores one or more pieces of first setting information and one or more pieces of second setting information, the first setting information defining an operation of a first application that runs on a guest OS, which is an OS running on a virtual machine, the second setting information, to be shared, being different from the first setting information and defining an operation of a second application that runs on at least one of another guest OS and a host OS that operates the virtualizing unit; and a non-transitory correspondence storage unit that stores first identification information, second identification information, and conversion information mapped to each other based on user name, the first identification information identifying one of the pieces of the first setting information, the second identification information identifying one of the pieces of the second setting information, and the conversion information indicating whether a conversion is necessary between data formats of the first setting information and the second setting information, the instructions causing the computer to:

receive an access request for accessing one of the pieces of the first setting information;

read the second identification information corresponding to one of the pieces of the first identification information of the first setting information for which the access request is received by the receiving unit, from the non-transitory correspondence storage unit, and, instead of accessing the requested one of the pieces of the first setting information in accordance with the access request, access one of the pieces of the second setting information of the second identification information that is read out;

judge whether the conversion information corresponding to the first identification information of one of the pieces of the first setting information for which the access request is received indicates that the conversion of the data formats is necessary; and execute, when it is judged that the conversion of the data formats is necessary, one or both of a conversion of data format of data that is to be written into one of the pieces of the second setting information and a conversion of data format of data that is read from one of the pieces of the second setting information.

* * * * *